United States Patent [19]

Doin et al.

[11] 4,443,579

[45] Apr. 17, 1984

[54] SILICONE RESIN COATING COMPOSITION ADAPTED FOR PRIMERLESS ADHESION TO PLASTIC AND PROCESS FOR MAKING SAME

[75] Inventors: James E. Doin, Hoosick Falls; Susan E. Hayes, Schenectady, both of N.Y.

[73] Assignee: General Electric Company, Waterford, N.Y.

[21] Appl. No.: 328,500

[22] Filed: Dec. 8, 1981

[51] Int. Cl.$^3$ .............................................. C08L 83/00
[52] U.S. Cl. .................................... 524/837; 525/477; 528/33; 528/34; 528/38; 528/16; 524/188; 524/262; 524/265; 524/266; 524/268; 524/379; 524/385; 524/588; 106/287.13
[58] Field of Search ................ 528/33, 34, 38, 16; 525/477; 524/188, 262, 265, 266, 268, 379, 385, 588, 837; 106/287.13

[56] References Cited

U.S. PATENT DOCUMENTS

| | | | |
|---|---|---|---|
| 2,460,805 | 2/1949 | Britton et al. | 528/16 |
| 3,708,225 | 1/1973 | Misch et al. | 351/160 |
| 3,976,497 | 8/1976 | Clark | 106/287 SE |
| 3,986,997 | 10/1976 | Clark | 260/29.2 M |
| 4,027,073 | 5/1977 | Clark | 428/412 |
| 4,051,161 | 9/1977 | Proskow | 106/287.13 |
| 4,159,206 | 6/1979 | Armbruster et al. | 106/287.12 |
| 4,177,315 | 12/1979 | Ubersax | 428/336 |
| 4,188,451 | 2/1980 | Humphrey, Jr. | 428/331 |
| 4,277,287 | 7/1981 | Frye | 106/287.12 |
| 4,278,804 | 7/1981 | Ashby et al. | 556/416 |

*Primary Examiner*—Melvyn I. Marquis
*Attorney, Agent, or Firm*—Hedman, Gibson, Costigan & Hoare

[57] ABSTRACT

A process is provided for preparing coating compositions suitable for a primerless application to plastic substrates, which includes catalyzed prehydrolysis of a silylated UV screen component. Preferred embodiments employ catalyzing agents which can be removed from the prehydrolysis solution. Coating compositions made by the process are also disclosed.

28 Claims, No Drawings

SILICONE RESIN COATING COMPOSITION ADAPTED FOR PRIMERLESS ADHESION TO PLASTIC AND PROCESS FOR MAKING SAME

This invention relates to improved protective coating compositions. More particularly, it relates to a process for preparing a silicone resin coating composition which will adhere readily to unprimed plastic substrates to form a tough, abrasion-resistant protective coating thereon.

BACKGROUND OF THE INVENTION

Recently, the substitution of glass with transparent materials which do not shatter, or are more resistant to shattering than glass, has become widespread. For example, transparent glazing made from synthetic organic polymers is now utilized in public transportation vehicles such as trains, buses, taxis and airplanes. Lenses for eye glasses and other optical instruments, as well as glazing for large buildings, also employ shatter-resistant, transparent plastics. The lighter weight of these plastics in comparison to glass is a further advantage, especially in the transportation industry where the weight of the vehicle is a major factor in fuel economy.

While transparent plastics provide a major advantage of being more resistant to shattering than glass, a serious drawback lies in the ease with which these plastics mar and scratch, due to everyday contact with abrasives, dust, cleaning equipment and ordinary weathering. Continuous scratching and marring results in impaired visibility and poor aesthetics, and oftentimes requires replacement of the glazing or lens or the like.

One of the most promising and widely used transparent plastics for glazing is polycarbonate, such as that known as LEXAN®, sold by General Electric Company. It is a tough material, having high impact strength, high heat deflection temperature and good dimensional stability. It is also self-extinguishing, and easily fabricated. Acrylics, such as polymethylmethacrylates, are also widely used glazing and lens materials.

Attempts have been made to improve the abrasion resistance of these transparent plastics. For example, scratch-resistant coatings formed from mixtures of silica, such as colloidal silica or silica gel, and hydrolyzable silanes in a hydrolysis medium, such as alcohol and water, are known. Misch, et al., U.S. Pat. No. 3,708,225; Clark, U.S. Pat. Nos. 3,986,997, 3,976,497 and 4,027,073; Armbruster, et al., U.S. Pat. No. 4,159,206; and Ubersax, U.S. Pat. No. 4,177,315, for example, describe such compositions. Improved such compositions are also described in commonly assigned copending U.S. application Ser. No. 964,910 filed Nov. 30, 1978, abandoned in favor of Ser. No. 415,844 filed Sept. 8, 1982, and Frye, U.S. Pat. No. 4,277,287.

It has been discovered that such polysilicic acid coatings, especially if acidic, fail to adhere to certain plastic substrates, such as polycarbonate, and, even if prepared on the basic side of neutrality, they may adhere initially, but they will peel after brief light aging. In copending application Ser. No. 91,716, filed Nov. 6, 1979, now U.S. Pat. No. 4,299,746, the addition of an ultraviolet (UV) light absorbing agent, such as 2,4-dihydroxybenzophenone, is suggested, but in some cases this may have a plasticizing effect and polycarbonate seems to have a tendency to reject the coating on severe exposure. Another approach is to use a primer coat which adheres to both the silicone resin coating and the polycarbonate substrate, and also serves as a binder for high levels of UV absorbers. The second coat is put on over the primer coat. See, for example, commonly assigned Humphrey, Jr., U.S. Pat. No. 4,188,451.

To avoid the need for a primer coat, commonly assigned copending U.S. application Ser. No. 34,164, filed Apr. 27, 1979, now U.S. Pat. No. 4,413,088 suggests replacing the usual solvents, e.g., isobutanol, with a more aggressive solvent, e.g., an ester, a ketone, a nitroparaffin, or the like. However, these are expensive and generally might require process modifications.

Other approaches to the elimination of primers from the application of silicone coatings to plastic are described in commonly assigned copending U.S. application Ser. Nos. 326,197, filed Dec. 1, 1981 and 154,624 filed May 30, 1980, now U.S. Pat. No. 4,373,061. The first-mentioned describes shock curing of silicone resin coatings at elevated temperatures to yield an adherent coating without the use of primers. The latter application discloses that certain UV screener-functionalized silicone resin coating compositions admit to primerless adhesion to plastic, although a lengthy aging period may be required before these compositions are ready to use.

The above-mentioned patents and applications are incorporated herein by reference.

SUMMARY OF THE INVENTION

It has now been discovered that the aging period required when using a silylated UV screen in a silicone resin coating can be dramatically shortened by prehydrolyzing the silylated UV screen, and, moreover, by catalyzing the prehydrolysis. The hydrolyzed UV screen can then be added to a prepared silicone resin composition and applied without delaying to an unprimed plastic substrate to form, after curing, a tough, mar-resistant, transparent coating thereon. Alternatively, the hydrolysis solution can be diluted in a large volume of alcohol and used directly in the preparation of the silicone resin composition to form a complete coating composition.

The prehydrolysis is typically catalyzed by weak acid, such as acetic acid, although catalysis with base, such as ammonium hydroxide, followed by neutralization with acid or acid-treated material is also contemplated. It has also been discovered that special advantages in terms of short reaction time, controlled hydrolysis, and stability are gained if the hydrolysis catalyst employed is a solid acid- or base-functionalized material, such as acid treated clay or an ion exchange resin, which can be removed by simple filtration and thereby eliminating from the coating composition reactants which may form salts or promote hazing.

Accordingly, it is the object of this invention to provide improved silicone resin coating compositions.

It is a further object of this invention to provide silicone resin coating compositions which will adhere readily to plastic substrates without the use of primers.

It is a further object of this invention to provide silicone resin coating compositions containing silylated UV screening compounds which do not require aging before they are ready for use.

It is a further object of this invention to provide a process for the catalyzed prehydrolysis of silylated UV screening compounds, and their incorporation into silicone resin coatings.

These and other objects are accomplished herein by a coating composition adopted for adhesion to plastic substrates without the use of primers, prepared by:

(A) hydrolyzing
   (i) a silylated ultraviolet light screening compound in the presence of;
   (ii) an agent to catalyze hydrolysis of said silylated ultraviolet light screening compound; and thereafter
(B) adding a minor proportion of the hydrolysis product of step (A) to a major proportion of an aqueous partially condensed silicone resin composition including colloidal silica.

In another feature of this invention, a small amount of aqueous silicone resin may be present in the hydrolysis mixture of step (A).

In another feature of this invention, the hydrolysis product of step (A) can be diluted in a large volume of alcohol, such as isobutanol, and used as a solvent in the preparation of the aqueous partially condensed resin composition including colloidal silica.

The process of preparing the coating compositions of this invention is also contemplated.

DETAILED DESCRIPTION OF THE INVENTION

The coating compositions of this invention are prepared by prehydrolyzing the silane function of a silylated ultraviolet light (UV) screening compound and adding it to an aqueous silicone resin.

The silylated UV screens which are suitable for this invention have the general formula

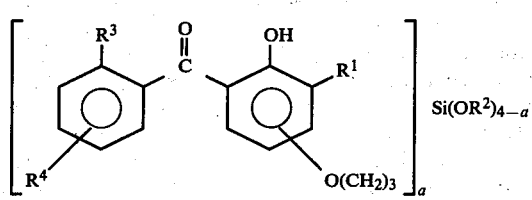

wherein $R^1$ is hydrogen, $C_1-C_8$ alkyl or halogen; $R^3$ and $R^4$ are hydrogen, $C_1-C_8$ alkoxy, carboxy, halogen, hydroxy, amino, carbethoxy or $-Q-(CH_2)_3Si(OR^2)_3$; Q is $-NH-$ or $-O-$; $R^2$ is $C_1-C_8$ alkyl; and a is an integer equal to 1-3 inclusive. These compounds can be made following the description in U.S. Pat. No. 4,278,804 (Ashby et al.), which is incorporated herein by reference.

The silylated UV screens used in accordance with the present invention must be soluble in, and otherwise compatible with, the silicone resin. 4-(3-triethoxysilylpropoxy)-2-hydroxybenzophenone is preferred.

Once hydrolyzed and mixed with the silicone resin, it is believed that the silylated UV screens copolymerize into the silicone, as is suggested by their low volatility upon curing and continuous heating. The UV compounds used in the present invention are particularly effective in protecting polycarbonate from discoloration.

Any amount of silylated UV screen which is effective to prevent discoloration of the substrate to which the composition will be applied can be used herein. In general, it has been found that best results are obtained if the UV screen is employed in amounts from 8 to 20 weight percent of the total solids of the coating composition.

Catalyzed prehydrolysis of the silane function of the silylated UV screen component of the present invention makes it possible to eliminate the long aging period (5 to 10 days) usually required when using a silylated UV screen by providing the silanol functionality necessary for the UV screen to be incorporated into the structure of the silicone resin. In another feature of this invention, the silylated UV screen is prehydrolyzed in the presence of some silicone resin. This may result in a partial copolymerization of the screen and the resin, which may further assist the incorporation of the UV screen into the final silicone resin coating composition. Accordingly, it may be advantageous, in the practice of this invention, to carry out the prehydrolysis of the silylated UV screen in the presence of a small amount of silicone resin, described hereinafter. It is believed that this prevents self-polymerization of the UV screen and its possible precipitation out of the hydrolysis solution.

The hydrolysis catalysts suitable for practicing this invention include any acid, base, or acid-functionalized material which will increase the rate of conversion of the silane function of the silylated UV screen to a silanol. Because strong acids or bases generally result in precipitation, weak acids, especially acetic acid, and weak bases, especially ammonium hydroxide, are preferred. Especially preferred catalysts are solid, acid-functionalized materials, such as acid-treated clays, carboxylic acid functional cation exchange resins or base functional anion exchange resins, which can be removed easily when the optimal silanol population is achieved. Most preferred such catalysts are sulfuric acid treated clay, such as that sold as FILTROL #20 ® (Filtrol Corporation), and carboxylic acid functional cation exchange resins, such as various grades of AMBERLITE ® (Rohm & Haas Co.). This type of catalyst has added advantages over soluble catalysts in that (1) the prehydrolysis product containing the UV screen is more stable, (2) the catalyst is removed from the system, (3) the pH of the final coating composition will require little or no adjustment, and (4) there is no risk of the formation of salts (for example acetates, in the case of acetic acid catalysis) which shorten the service life of the coating composition.

The silanol population in the prehydrolysis solution determines the performance of the coating composition to which the solution is added. If hydrolysis proceeds too far or not far enough, performance of the coating composition in terms of weatherability and resistance to cracking will suffer. The optimal silanol population cannot as yet be determined, but because it is a function of the reaction time of hydrolysis, which can be monitored closely, the hydrolysis can be stopped at the reaction time corresponding to the optimal silanol population. Reaction time, therefore, is a critical parameter of the instant invention.

It should be noted, however, that the critical reaction time varies from catalyst to catalyst. Other variables such as the pH of the hydrolysis solution, the solvents used, the presence or absence of resin, and the amount of catalyst employed, have an effect on the reaction as well. Therefore, some simple trial-and-error experimentation is contemplated to reveal the critical reaction times for the many catalysts suitable for practicing this invention.

In order to gain a margin of flexibility with regard to the critical reaction time involved in the use of a particular catalyst, two preparation techniques have been developed which allow more precise regulation of the hydrolysis. One technique, helpful when a weak acid or acid-functionalized material is employed as a catalyst, calls for using low levels, such as about 0.15 to 0.3 weight percent of the catalyst. This drives the hydrolysis reaction at a slow enough rate to allow some flexibility on the reaction cut off time and consequently minimizes the risk of overrunning the optimum silanol population point, which may lead to the silylated UV screen precipitating out of the final coating composition. The other technique, employed to avoid self-polymerization of the UV screen silanols formed during prehydrolysis, involves the stabilization of the silanol groups by diluting the hydrolysis solution in a large volume of an alcohol, such as isobutanol. The diluted mixture, containing the UV screen, can then be used as a solvent directly in the preparation of the silicone resin coating composition.

The aqueous silicone resin compositions suitable for this invention are any of the polysilicic acid coatings well-known in this art. Such compositions include those described in the aforementioned patents, U.S. Pat. Nos. 3,986,997 and 4,027,073 (Clark); U.S. Pat. No. 4,177,315 (Ubersax); U.S. Pat. No. 4,277,287 (Frye); U.S. Pat. No. 4,159,206 (Armbruster, et al.); and U.S. application Ser. No. 964,910. These patents and application are incorporated herein by reference.

In the practice of the present invention, preferred aqueous colloidal silica dispersions generally have a particle size of from 5 to 150 millimicrons in diameter. Colloidal silicas having an average particle size of from 10 to 30 millimicrons are most preferred. These silica dispersions are well-known in the art and commercially available ones include, for example, those sold under the trademarks of LUDOX ® (duPont) and NALCOAG ® (NALCO Chemical Co.). A particularly preferred product for the purposes herein is known as LUDOX LS ® (duPont). Such colloidal silicas are available as both acidic and basic hydrosols.

In order to prevent flowmarks, dirtmarks, and the like, on the surface of the substrates to which the coatings of this invention are subsequently applied, it will be advantageous to include in the silicone resin composition a polysiloxane polyether copolymer as disclosed in U.S. Pat. No. 4,277,287 (Frye). For the purposes of this invention, the polysiloxane polyether copolymer is employed in an amount from about 2 to about 15 weight percent of the total solids of the composition. Most advantageous results are achieved when the copolymer is utilized at about 4 weight percent of the total solids. At these amounts, this additive prevents marks on the substrate which impair visibility or are aesthetically detracting but has no significant deleterious effects on the otherwise excellent abrasion resistance, adhesion, and resistance to discoloration of the coating. Moreover, the presence of the polysiloxane polyether copolymer has been found to reduce the incidence of stress cracking in the cured coating.

The coating compositions of the present invention can be applied to a variety of solid substrates by conventional methods, such as flowing or dipping, to form a continuous surface film. Substrates which are especially contemplated herein are transparent and non-transparent plastics. As noted above, the coating compositions of this invention are especially useful as coatings for polycarbonates, such as those polycarbonates known as LEXAN ®, sold by General Electric Company.

The coating compositions prepared according to the present invention will adhere to plastic substrates without the use of primers. A hard coating having all of the aforementioned characteristics and advantages is obtained by the removal of the solvent and volatile materials. The coating composition will air-dry to a tack-free condition, but heating in the range of 75° C. to 200° C. is necessary to obtain condensation of residual silanols in the partial condensate. This final cure results in the formation of silsesquioxane ($RSiO_{3/2}$). In the finished cured coating the ratio of $RSiO_{3/2}$ units to $SiO_2$ will range from about 0.43 to about 9.0, preferably 1 to 3. A cured coating having a ratio of $RSiO_{3/2}$ to $SiO_2$, when R is methyl, of 2 is most preferred. The coating thickness can be varied by means of the particular application technique, but coatings of about 0.5 to 20 microns, preferably 2–10 micron thickness are generally utilized.

In order that those skilled in the art may better understand how to practice the present invention, the following examples are given by way of illustration and not by way of limitation.

EXAMPLES 1-5

A stock of aqueous silicone resin is prepared as follows:

22.1 parts by weight of LUDOX LS ®, silica sol (aqueous dispersion of colloidal silica, average particle size is 12 millimicrons, pH of 8.2 sold by duPont) is added to a solution of 0.1 parts by weight of methyltriacetoxysilane in 26.8 parts by weight of methyltrimethoxysilane. The temperature of the reaction mixture is maintained at 20° C. to 30° C., preferably below 25° C. The hydrolysis is allowed to continue for 24 hours. The solids content of the resultant reaction mixture is 40.5% and is diluted to about 20% solids with the addition of isobutanol. One part by weight (5% of solids) of SF-1066 (polysiloxane polyether copolymer, sold by General Electric) is thoroughly mixed with 99 parts by weight of the resultant composition. The final composition has a pH of higher than 7.2.

The silylated UV screen, 4-(3-triethoxysilylpropoxy)-2-hydroxybenzophenone (SHBP), is prehydrolyzed as follows:

55.7 parts by weight of isobutanol, 14.0 parts by weight of the stock silicone resins, and 11.2 parts by weight water are added to a reaction vessel and mixed until homogeneous. 0.5 parts by weight of FILTROL #20 ® (acid-treated clay used as a catalyst, sold by Filtrol Corp., is added slowly and stirred for five minutes. 18.6 parts by weight SHBP is added, with vigorous stirring over a ten minute period. The reaction vents are closed off and the mixture allowed to stir. Samples are removed after 3, 4 and 5 hours. The reactions mixtures are each filtered through a 2μ pad. 1.0 weight percent OOLITIC "C" ® (a $CaCO_3$ neutralizing agent, sold by Calcium Carbonate Company) is added to the filtrate, stirred 30 minutes, then filtered again.

The five-hour hydrolysis solution forms a precipitate and is unsuitable for use in a coating. Coating compositions were prepared with the 3-hour and 4-hour solutions as follows:

|  | Coating A | Coating B |
| --- | --- | --- |
| isobutanol | 20 grams | 20 grams |
| stock resin | 200 grams | 200 grams |
| 3-hour prehydrolysis solution | 34 grams | — |
| 4-hour prehydrolysis | — | 34 grams |

-continued

| | Coating A | Coating B |
|---|---|---|
| solution | | |

Coatings A and B are flow coated on different unprimed LEXAN ® panels and dried 30 minutes. After curing 30 minutes at 125° C., the coated panels are tested for adhesion.

Adhesion of the coating compositions to the panels is tested by the scribed adhesion method, whereby a crisscross pattern of scratches are made in the resin film, Scotch 3M-710 tape is applied and pulled away. Three tape pulls without loss of adhesion is considered passing. For the two coatings above, Coating A (3-hour) is hazy and shows poor adhesion; Coating B (4-hour) is clear and shows good adhesion.

Two more unprimed LEXAN ® panels are coated with Coating B (4-hour reaction time), dried and cured at 130° for 1 hour and 2 hours, respectively, then tested for abrasion-resistance and weatherability.

Abrasion resistance is tested by measuring the increase in haze ($\Delta\%H$) after 500 cycles on a Taber Abraser using a 500-gram load and CS-10F wheels. Resistance to weathering is tested on a QUV Accelerated Weathering Tester, which uses continuous alternating cycles of eight-hours of ultraviolet radiation at 60° C., then four hours condensation at 50° C. Adhesion is tested periodically until it fails, the resistance then being recorded as the number of hours before adhesion failure.

The results for the two panels cured at 130° C. with Coating B were as follows:

| | $\Delta \% H$ | QUV Life |
|---|---|---|
| cured 1 hour | 8.5 | failure at 283 hours |
| cured 2 hours | 8.2 | failure at 431 hours |

EXAMPLES 6-11

32.2 parts by weight each of isopropanol and isobutanol, 12.9 parts by weight water, and 1.34 parts by weight IRC-84 (an AMBERLITE ® cation exchange resin, sold by Rohm & Haas) are added to a flask and thoroughly mixed. 21.45 parts by eight SHBP are added slowly to the stirring mixture.

Aliquots of 14.7 grams of the prehydrolysis solution are withdrawn at different times, as the hydrolysis proceeds, and these are added to 100 grams of the stock resin to form coating compositions, as follows:

| Coating | Required Time | Appearance |
|---|---|---|
| 1 | 6 hours | no haze |
| 2 | 7 hours | no haze |
| 3 | 10 hours | no haze |
| 4 | 12 hours | slight haze |
| 5 | 14 hours | large precipitate |
| 6 | 16 hours | large precipitate |

Coatings 1-4 are applied to LEXAN ® panels, dried and cured 30 minutes at 125° C. Coating 1 has good adhesion and no cracks; coating 2 has 10% adhesion failure and no cracks; coating 3 fails adhesion but has no cracks; coating 4 has poor adhesion.

Although coating 1 gave adequate results when used immediately, when the coatings were permitted to stand for about from 5 to 7 days, coating 3 gave a better overall balance of properties.

EXAMPLES 12-13

26.7 parts by weight each of isobutanol and isopropanol, 10.6 parts by weight water, 17.8 parts by weight of the stock resin, and 0.44 parts by weight of 58% ammonium hydroxide ($NH_4OH$) are added to a flask and thoroughly mixed. 17.8 parts by weight SHBP are added slowly to the violently stirred mixture.

The reaction is allowed to proceed for 4 hours, at which time half the mixture is removed (Part A), while the other half (Part B) continues reacting.

To Part A are added 11.8 parts by weight FILTROL #20 ®. The Part A mixture is stirred 30 minutes and filtered through a $2\mu$ pad. 3.8 parts by weight of OOLITIC "C" ® are added to the filtrate, which is stirred 15 minutes and refiltered through a $2\mu$ pad.

After 5 hours reaction time, Part B is treated identically as Part A.

Coating compositions A and B are prepared using Parts A and B in the following proportions:

| Coating A | Coating B |
|---|---|
| 100 grams stock resin | 100 grams stock resin |
| 17 grams Part A | 17 grams Part B |
| 9 grams isobutanol | 9 grams isobutanol |

Both coating solutions are mixed well and allowed to settle for about a quarter hour. Each is then flow coated on an unprimed LEXAN ® panel and air dried 20 minutes. The coatings show no haze or flow marks.

Both coated panels are cured 30 minutes at 125° C. Both coatings exhibit good adhesion with no cracks and no haze.

Both panels are then thermoformed at 143° C. for 25 minutes. Coating A (4-hour solution) shows cracking; Coating B (5-hour solution) shows only a few very small cracks.

2.6 weight percent SHBP and 3.2 weight percent SHBP coating compositions are made from the Part B solution. The QUV Life of panels treated with these coatings and cured for two hours at 125° C. is as follows:

| Coating | QUV Life |
|---|---|
| 2.6% SHBP | adhesion loss at 650 hours |
| 3.2% SHBP | adhesion loss at 1050 hours |

EXAMPLE 14

A prehydrolysis solution is prepared as follows:

28.0 parts by weight each of isopropanol and isobutanol, 11.2 parts by weight water, 18.6 parts by weight SHBP, 14.0 parts by weight of the stock resin and 0.23 parts by weight of IRC-84 (an AMBERLITE ® cation exchange resin, sold by Rohm & Haas) are mixed in a reaction vessel for 13 hours. The reaction product is filtered through $2\mu$ pad.

Two coatings are made using this hydrolysis product:

| | Coating A | Coating B |
|---|---|---|
| prehydrolysis solution | 90 grams | 86 grams |

| | Coating A | Coating B |
|---|---|---|
| stock resin | 700 grams | 500 grams |

Each of these coatings is applied to an unprimed LEXAN ® panel and, dried 20 minutes, and cured 1 hour at 125° C. The adhesion and abrasion resistance of both coatings is good.

EXAMPLE 15

A prehydrolysis solution is prepared as in Example 1, except after the first filtration its discharged directly into a large vessel containing 388 parts by weight butanol. The mixture shows no precipitation after 2 hours at room temperature.

Ths solution, containing prehydrolyzed SHBP, is used as the alcohol component to cut the solids content of the silicone resin/colloidal silica hydrolyzate in preparing the aqueous silicone resin. This coating solution is in turn flow coated on a LEXAN ® panel, dried for 20 minutes, and cured 1 hour at 130° C. The adhesion and abrasion resistance of the coating are good, and no cracks are present. After coating another panel and precuring for 45 minutes at 130° C., thermoforming produces very little cracking along edges, and the QUV Life is greater than 500 hours.

By following the teachings of this invention, a variety of useful, tough, and optically clear coatings can be made. The coating compositions are produced with a reduction in costs over conventional methods and are ready to use when formed.

Obviously, other compositions and variations of the present invention are possible in light of the foregoing disclosure. It is to be understood, therefore, that changes may be made in the particular embodiments of this invention which are within the full intended scope of the invention as defined by the appended claims.

We claim:

1. A coating composition adapted for adhesion to a plastic substrate without a primer, said composition being prepared by:
   (A) prehydrolyzing
      (i) a silylated ultraviolet light screening compound having the formula

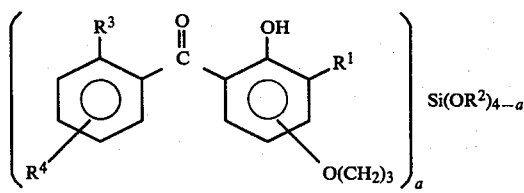

wherein $R^1$ is hydrogen, $C_1$–$C_8$ alkyl or halogen; $R^3$ and $R^4$ are hydrogen, $C_1$–$C_8$ alkoxy, carboxy, halogen, hydroxy, amino, carbethoxy or —Q—$(CH_2)_3Si(OR^2)_3$; Q is —NH— or —O—; $R^2$ is $C_1$–$C_8$ alkyl; and a is an integer equal to 1–3 inclusive, in the presence of
      (ii) an agent to catalyze conversion of the silane function of said silylated ultraviolet light screening compounds to a silanol; and thereafter
   (B) adding a minor proportion of the hydrolysis product of step (A) to a major proportion of an aqueous partially condensed silicone resin composition including colloidal silica.

2. The coating composition of claim 1, wherein the hydrolysis step (A) includes an additional component (iii) which is an aqueous partially condensed silicone resin composition including colloidal silica.

3. The coating composition prepared according to claim 1, wherein the catalyzing agent (ii) is removed before step (B).

4. The coating composition prepared according to claim 2, wherein the catalyzed agent (ii) is removed before step (B).

5. The coating composition of claim 3 or 4, wherein the catalyzing agent is a solid, acid-functionalized material.

6. The coating composition of claim 3 or 4, wherein the catalyzing agent is an acid-treated clay.

7. The coating composition of claim 3 or 4, wherein the catalyzing agent is a carboxylic acid-functionalized cation exchange resin.

8. The coating composition of claim 1 or 2, wherein the catalyzing agent is ammonium hydroxide.

9. The coating composition of claim 1 or 2, wherein the catalyzing agent is ammonium hydroxide, and two additional steps are included after step (A) and before step (B):
   (A) (1) neutralizing said catalyzing agent (ii) by the addition of a solid, acid-functionalized material; and thereafter
   (A) (2) removing said solid, acid-functionalized material by filtration.

10. The coating compostion of claim 1 or 2, wherein said aqueous partially condensed silicone resin composition including colloidal silica is a dispersion of colloidal silica in an aliphatic alcohol-water solution of the partial condensate of a silanol of the formula $RSi(OH)_3$, wherein R is selected from the group consisting of alkyl having 1 to 3 carbon atoms and aryl, at least 70 weight percent of the silanol being $CH_3Si(OH)_3$, said aqueous silicone resin containing 10 to 50 weight percent solids, said solids consisting essentially of 10 to 70 weight percent colloidal silica and 30 to 90 weight percent of the partial condensate.

11. The coating composition of claim 10, which contains in addition a small amount of a polysiloxane polyether copolymer.

12. The coating composition of claim 1 or 2, wherein the silylated ultraviolet light screening compound is 4-(3-triethoxysilylpropoxy)-2-hydroxybenzophenone.

13. A coating composition adapted for adhesion to a plastic substrate without a primer, said composition being prepared by:
   (A) prehydrolyzing
      (i) a silylated ultraviolet light screening compound having the formula

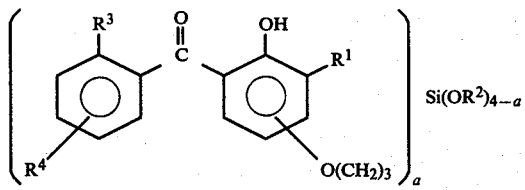

wherein $R^1$ is hydrogen, $C_1$–$C_8$ alkyl or halogen; $R^3$ and $R^4$ are hydrogen, $C_1$–$C_8$ alkoxy, carboxy, halogen, hydroxy, amino, carbethoxy or —Q—(CH$_2$)$_3$Si(OR$^2$)$_3$; Q is —NH— or —O—; R$^2$ is C$_1$-C$_8$ alkyl; and a is an integer equal to 1-3 inclusive, in the presence of
(ii) an agent to catalyze conversion of the silane function of said silylated ultraviolet light screening compound to a silanol; and thereafter
(B) mixing a minor proportion of the hydrolysis product of step (A) with a major portion of an alcohol; and thereafter
(C) adding the product of step (B) to an aqueous partially condensed silicone resin composition including colloidal silica.

14. The composition of claim 13, wherein the alcohol is isobutanol.

15. A process for preparing a coating composition adapted for adhesion to a plastic substrate without a primer, which comprises:
(A) prehydrolyzing
(i) a silylated ultraviolet light screening compound having the formula

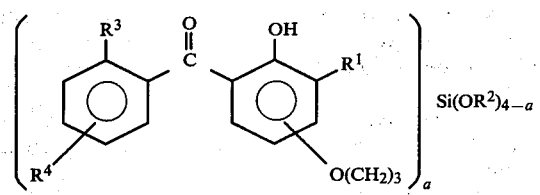

wherein R$^1$ is hydrogen, C$_1$-C$_8$ alkyl or halogen; R$^3$ and R$^4$ are hydrogen, C$_1$-C$_8$ alkoxy, carboxy, halogen, hydroxy, amino, carbethoxy or —Q—(CH$_2$)$_3$Si(OR$^2$)$_3$; Q is —NH— or —O—; R$^2$ is C$_1$-C$_8$ alkyl; and a is an integer equal to 1-3 inclusive, in the presence of
(ii) an agent to catalyze conversion of the silane function of said silylated ultraviolet light screening compounds to a silanol; and thereafter
(B) mixing a minor proportion of the hydrolysis product to step (A) with a major portion of an aqueous partially condensed silicone resin composition including colloidal silica.

16. The process of claim 15, wherein the hydrolysis step (A) includes an additional component (iii) which is an aqueous partially condensed silicone resin composition including colloidal silica.

17. The process of claim 15, wherein the catalyzing agent (ii) is removed before step (B).

18. The process of claim 16, wherein the catalyzing agent (ii) is removed before step (B).

19. The process of claim 17 or 18, wherein the catalyzing agent is a solid, acid-functionalized material.

20. The process of claim 17 or 18, wherein the catalyzing agent is an acid-treated clay.

21. The process of claim 17 or 18, wherein the catalyzing agent is a carboxylic acid-functionalized cation exchange resin.

22. The process of claim 15 or 16, wherein the catalyzing agent is ammonium hydroxide.

23. The process of claim 15 or 16, wherein the catalyzing agent is ammonium hydroxide, and two additional steps are included after step (A) and before step (B):
(A) (1) neutralizing said catalyzing agent (ii) by the addition of a solid, acid-functionalized material; and thereafter
(A) (2) removing said solid, acid-functionalized material by filtration.

24. The process of claim 15 or 16, wherein said aqueous partially condensed silicone resin composition including colloidal silica is a dispersion of colloidal silica in an aliphatic alcohol-water solution of the partial condensate of a silanol of the formula RSi(OH$_3$, wherein R is selected from the group consisting of alkyl having 1 to 3 carbon atoms and aryl, at least 70 weight percent of the silanol being CH$_3$Si(OH)$_3$, said aqueous silicone resin containing 10 to 50 weight percent solids, said solids consisting essentially of 10 to 70 weight percent colloidal silica and 30 to 90 weight percent of the partial condensate.

25. The process of claim 24, which contains in addition a small amount of a polysiloxane polyether copolymer.

26. The process of claim 15 or 16, wherein the silylated ultraviolet light screening compound is 4-(3-triethoxysilylpropoxy)-2-hydroxybenzophenone.

27. A process for preparing a coating composition adapted for adhesion to a plastic substrate without a primer, which comprises:
(A) prehydrolyzing
(i) a silylated ultraviolet light screening compound having the formula

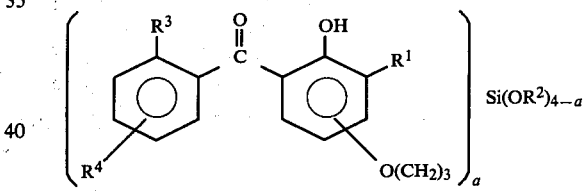

wherein R$^1$ is hydrogen, C$_1$-C$_8$ alkyl or halogen; R$^3$ and R$^4$ are hydrogen, C$_1$-C$_8$ alkoxy, carboxy, halogen, hydroxy, amino, carbethoxy or —Q—(CH$_2$)$_3$Si(OR$^2$)$_3$; Q is —NH— or —O—; R$^2$ is C$_1$-C$_8$ alkyl; and a is an integer equal to 1-3 inclusive, in the presence of
(ii) an agent to catalyze conversion of the silane function of said silylated ultraviolet light screening compound to a silanol; and thereafter
(B) mixing a minor proportion of the hydrolysis product of step (A) with a major porportion of an alcohol; and thereafter
(C) adding the product of step (B) to an aqueous partially condensed silicone resin composition including colloidal silica.

28. The process of claim 27, wherein the alcohol is isobutanol.

* * * * *

UNITED STATES PATENT AND TRADEMARK OFFICE
CERTIFICATE OF CORRECTION

PATENT NO. : 4,443,579
DATED : April 17, 1984
INVENTOR(S) : James E. Doin and Susan E. Hayes It is certified that error appears in the above—identified patent and that said Letters Patent is hereby corrected as shown below:

In column 12, at line 14, correct the chemical formula to read -- $RSi(OH)_3$ --.

Signed and Sealed this

Twenty-third Day of October 1984

[SEAL]

Attest:

GERALD J. MOSSINGHOFF

Attesting Officer    Commissioner of Patents and Trademarks